Oct. 6, 1959  J. D. SAUTER  2,907,565
STRIP LOOP CONTROL SYSTEMS
Filed May 25, 1956  3 Sheets-Sheet 1

Fig. 1

INVENTOR.
John D. Sauter
BY
Harry P. Canfield
Attorney

Oct. 6, 1959 J. D. SAUTER 2,907,565
STRIP LOOP CONTROL SYSTEMS
Filed May 25, 1956 3 Sheets-Sheet 2

INVENTOR.
John D. Sauter
BY Harry P. Canfield
Attorney

Fig. 5

United States Patent Office 2,907,565
Patented Oct. 6, 1959

2,907,565

STRIP LOOP CONTROL SYSTEMS

John D. Sauter, Lyndhurst, Ohio, assignor to The Clark Controller Company, Cleveland, Ohio, a corporation of Ohio Application May 25, 1956, Serial No. 587,358

12 Claims. (Cl. 271—2.2)

This invention relates to electric control systems of the class in which material, for example strip material, is propelled linearly by an electric motor, at constant linear speed.

The invention relates more particularly to such control systems in which the strip is drawn by a first motor from a supply such as a spool or reel on which it is wound, and is fed thereby into a depending loop formed in the material, and is drawn out of the loop by a second motor running at constant speed and propelled thereby at constant speed to a point of use, for example to a strip processing apparatus; and the speed of the first motor is automatically controlled to maintain the loop of substantially constant length.

As is well known to those skilled in the art, the loop acts as a pool or reservoir of strip; and, being maintained at constant length, the load on the second motor in drawing the strip therefrom is maintained constant, so that the speed of the second motor will not be varied thereby, and can propel the strip on to a strip processing apparatus at constant speed.

An embodiment of the invention is described hereinafter, and in this embodiment, it comprises in general the following elements and mode of operation; the actual invention being that set forth in the appended claims.

A first electric generator is driven at constant speed and by its output drives a first electric motor which draws strip material from a reel and feeds it into a loop depending between electric light lamps and photoelectric tubes.

A second generator is driven at constant speed and by its output drives a second electric motor which draws the strip out of the loop and propels it forwardly at constant speed for use in a strip processing apparatus or the like, not a part of the invention.

The field of the second generator is energized at a constant value and determines the speed of the second motor.

The field of the first generator is energized by the output of a magnetic amplifier.

The magnetic amplifier has two control windings wound in opposition. One winding is energized at constant value by the second generator and is poled to increase the amplifier output, and thereby increase the first generator field energization, and the speed of the first motor. The other control winding is energized by the first generator and opposes the one winding, and is poled to decrease the amplifier output and thereby decrease the speed of the first motor.

The speed of the first motor is independently adjustable by a shunt field.

By this means the two motors tend to propel the strip at the same speed and to maintain the loop at a constant predetermined length.

Any change that may occur in the loop length exposes more or fewer photo tubes to the lamp light and changes the current in a photo tube circuit energized from a source of current.

Changes in the photo tube current actuate a control to restore the loop to the predetermined length.

This control comprises a pair of differential control windings on the amplifier. One winding of the pair is energized at constant voltage. Energization of the other winding of the pair is varied. It increases upon increase of photo tube current caused by shortening of the loop, and then preponderates over the one winding and increases the amplifier output, which increases the first generator field and the generator output, to drive the first motor faster; and energization of the said other winding of the pair similarly decreases upon lengthening of the loop; and the one winding then preponderates over it and decreases the amplifier output to cause the speed of the first motor to decrease. By this means any change in length of the loop is corrected and it is maintained at constant length.

The said variably energized winding of the said pair is energized through the principal electrodes of an electronic tube having a control grid which in turn is energized by potential varying with the photo tube current; the varying potential being derived from the drop of potential in a resistor through which the photo tube current flows.

Adjusting means is provided by which the constant length of the loop may be adjustably predetermined.

The speed at which the strip is propelled to said process may be adjusted by adjusting the field of the second generator to change the constant speed of the second motor. When the strip speed is adjusted to a high value, the control of the speed of the first motor to maintain the loop at constant length, is very sensitive to changes of loop length, so that as the loop tends to increase or decrease in length, the first motor will restore the length by a small percentage of change of speed.

When the strip speed is adjusted to a low value, the first motor, in the absence of countervailing provisions, would have to speed up or slow down by a greater percentage of speed change, in restoring the loop to its constant length upon a deviation therefrom.

This is in some cases undesirable. Means is therefore provided to adjust the system so that the percentage of change of speed of the first motor in correcting deviations of loop length will be substantially the same at all strip speeds.

The said photo tubes are connected in parallel in a bank and provision is made by which the individual photo tubes may always be subjected to the same potential, although the total current in the photo tube circuit changes, whereby the photo tubes respond to change the current in the photo tube circuit with the same sensitivity of response, whether the loop is long or short, and whether accordingly few or many of the tubes are exposed to lamp light.

It is an object of the invention to provide generally an improved control system for maintaining at constant length a strip loop as referred to in the premises.

Another object is to provide a strip loop length control having features and a mode of operation such as are described in the foregoing, singly or in combination.

Other objects will become apparent hereinafter to those skilled in the art.

An embodiment of the invention is fully disclosed in the following description taken in connection with the accompanying drawing, in which.

Figure 1:
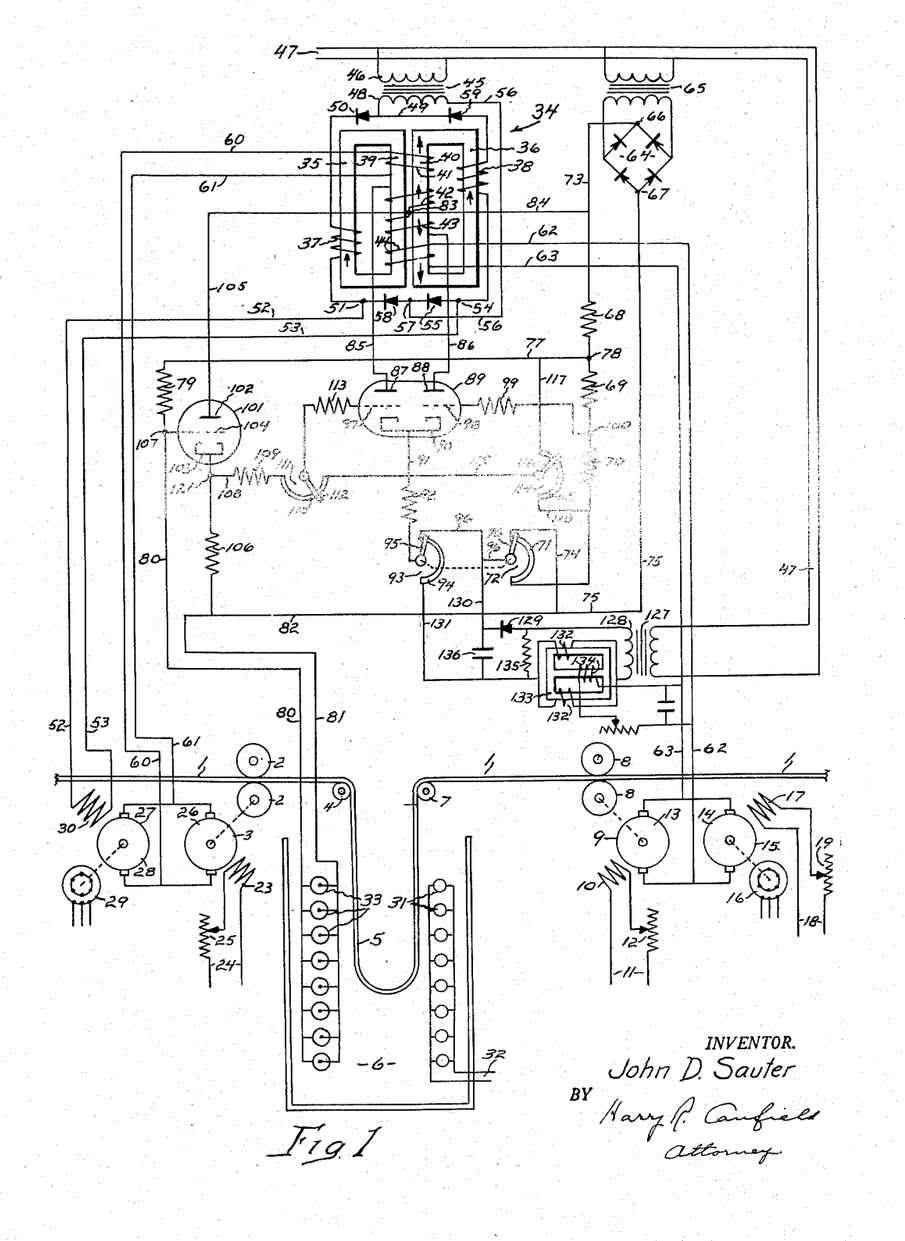
Fig. 1 is a diagrammatic view of an embodiment of the invention.

Referring to Fig. 1 of the drawing, there is shown at 1 a strip of material, coming at its left end from a supply, for example a spool or reel, on which it is wound, but not shown.

The strip is propelled toward the right by rolls 2—2 driven by a motor 3 and over a roll 4 and down into a loop 5 depending into a pit 6.

The strip is drawn out of the loop 5 over a roll 7 and propelled forwardly toward the right by rolls 8—8 driven by a motor 9; and therebeyond goes to a strip processing apparatus not shown.

It is an end result of the invention that the strip loop is maintained at substantially constant length and that the strip is propelled by he motor 9 at constant speed, dictated by the needs of the strip processing apparatus.

It has been found to be impracticable to draw the strip directly from a reel by the motor 9 because of changes of load on the motor, due to irregular changes of the tension in the strip that will inevitable occur, and the consequent difficulty of holding the motor at constant speed.

The loop 5 constitutes a pool or reservoir of strip, and according to the invention, the loop is maintained at constant length by corrective changes in the speed of the motor 3 when the loop tends to change in length, and thus the load on the motor is maintained constant and thereby the difficulties of maintaining the strip speed constant are obviated.

The motor 9 is a D.C. motor having a shunt field 10 energized from a suitable source 11 of direct current, at substantially constant voltage, through an adjusting rheostat 12.

The armature 13 of the motor 9 is, as shown, supplied with current from the armature 14 of a D.C. generator 15 driven at substantially constant speed by a motor, for example an induction motor 16 as shown.

The generator 15 has a shunt field 17 energized from a suitable D.C. source 18 at substantially constant voltage, and is adjustable by a rheostat 19.

Due to the constant load on the motor 9, effected as referred to, and to the consequent constant load on the generator 15, the motor 9 will run at constant speed and propel the strip 1 at a speed constant enough to meet the requirements of the strip processing apparatus usually encountered; but if a still higher degree of constantcy is wanted an automatic speed regulator of known type may be provided for the motor 9.

As will be referred to, the constant speed of the strip 1 propelled by the motor 9 may need to be of different values for different strip processing apparatuses, and the speed may be set to the wanted speed by adjusting the constant spped of the motor 9; and this is preferably done by means of the rheostat 19 which adjusts the output of the generator 15 going to the motor.

The motor 3 is a D.C. motor having a shunt field 23 energized from a suitable source 24 of D.C. through an adjusting rheostat 25.

The armature 26 of the motor 3 is supplied with current from the armature 27 of a D.C. generator 28 as shown, driven at substantially constant speed by a motor 29, for example an A.C. induction motor as shown.

The generator 28 has a variable shunt field 30.

It is an important feature of the invention to be described that energization of the generator field 30 varies automatically in correspondence with the tendency of the length of the loop 5 to change, and this varies the output of the generator 28 going to the motor 3 and thereby varies the motor speed to vary the rate at which the motor feeds strip into the loop 5, with the net resul tthat the loop is maintained at a constant length or within a very small range of lengths. This will now be described.

In the pit 6, on opposite sides of the loop 5 are a vertical bank of electric lamps 31—31 energized by a circuit 32, and a vertical bank of photo-tubes 33—33.

The light from the lamps 31 illuminates the photo tubes 33, the loop 5 cutting off the light from more or fewer of the photo-tubes at the lower end of the bank as the loop changes in length.

Shown generally at 34 is a magnetic amplifier comprising side cores 35—36 having main winding at 37 and 38 thereon; and central cores 39 and 40 having control windings thereon and common thereto at 41, 42, 43 and 44.

A transformer 45 having a primary 46 energized from a source of A.C. at 47 has a secondary 48 supplying input current to the amplifier.

Waves of A.C. from the left end of the secondary 48 flow to a wire 49, thence through a rectifier 50 and the main winding 37 and to an output point 51 and thence by wire 52 to the generator field 30 and back by wire 53 to an output point 54, and thence through a rectifier 55 and by a wire 56 to the right end of the secondary 48.

Waves of A.C. from the right end of the secondary 48 flow by the wire 56 to a point 57 and thence through a rectifier 58 to output point 51 and by wire 52 to the generator field 30 and by wire 53 to the other output point 54 and through the main winding 38 and a rectifier 59 to the left end of the secondary.

The field 30 thus constitutes the output load of the amplifier.

The main windings 37 and 38 are poled so that flux produced thereby flows say upwardly in both side cores 39 and 40.

The control winding 41 is connected, by wires 60 and 61, across the generator armature 28 and is poled to "oppose" the main windings 37—38; and the control winding 44 is connected by wires 62 and 63 across the generator armature 14 and is poled to "assist" the main windings 37—38.

Energization of the control windings 42 and 43 will be described later.

For purposes of description of the initiations of the action of the amplifier 34 it can be assumed that the induction motors 16 and 29 are both running and driving both generators 15 and 28, and that because of high reactance provided in the main windings 37 and 38, the output of the amplifier going to the generator field 30 is momentarily of low value, and that therefore energization of the control winding 41 by the generator 28, is at a low value. And it may be assumed that the field 17 of the generator 15 is energized, and that the generator therefore energizes the control winding 44 at a high value; and that, by assisting the flux of the main windings 37 and 38, the control winding 44 causes the amplifier output to rise and may be said to "turn on" the amplifier. This amplifier output energizes the field 30 of the generator 28 and its output rises and energizes the control winding 41 with a rising value, opposing the effectiveness of the control winding 44, and tending to "turn off" the amplifier.

The output of the amplifier then falls acordingly, and the energization of the field winding 30 stops rising, and energization of the control winding 41 thereby stops rising.

The effectiveness of the control winding 41 to tend to turn off the amplifier can never rise to a value that completely neutralizes the effectiveness of the control winding 44 to turn it on. If it did, the output of the amplifier going to the field 30 would drop to a negligible value again whereupon the control winding 44 would be acting alone and would again raise the output of generator 28 and energization of the control winding 41.

These events are, for purposes of description, described here as occurring in sequence, but in actual practice they all occur in a very short interval of time, with the result that the relative energization of the control windings 41 and 44 come to what may be called a balanced condition, with the winding 44 predominating over the winding 41 by an amount that causes the amplifier to energize the field winding 30 at a certain value, and causes the generator 28 in turn to drive the motor 3 at a certain speed;

which speed may be adjusted to a suitable value by the rheostat 25.

The aforesaid values are predetermined in a manner known to those skilled in the art so that if the loop happens at this time to be at the desired predetermined length, the motor 3 will propel the strip 1 at the same speed as the motor 9; and the control will be in working condition, and maintain the loop at that length.

But the speed of the motor 3 is subject to being increased or decreased by features of the control which respond to variations occurring in the length of the loop or departure thereof from the desired length, which will now be described.

A rectifier 64 having A.C. input from a transformer 65 connected to the A.C. source 47, has D.C. output at terminal points 66 and 67 the point 66 being considered as positive.

A voltage divider comprising resistors 68, 69 and 70, and the resistor element 71 of a potentiometer 72, is connected across the rectifier points 66 and 67 by wires 73, 74 and 75.

This potentiometer 72 has a rotary element 76 movable over the resistor 71; and it will be referred to later in connection with a particular feature of the control, but here it is considered with the rotary element 76 in the position shown, with all of the resistance 71 in the voltage divider circuit.

A photo tube circuit is provided, including wire 77 connected to a point 78 on the voltage divider between the resistors 68 and 69; a resistor 79; a wire 80 going to the photo tubes 33; and a wire 81 coming from the photo tubes connected to a wire 82 that continues into the wire 75. The photo tubes are connected in parallel as shown across the wires 80 and 81, and current flows through them supplied by the rectifier 64 but at the reduced potential of the point 78, and the current goes through the resistor 79.

In view of what has been said heretofore, it will be apparent that if the loop 5 should, due to any cause, tend to become shorter, the photo tube bank 33 in the lower portion thereof will receive more light from the lamps 31, and by the known action of photo tubes, this will increase the current in the said photo tube circuit, including the resistor 79, and vice versa if the loop should tend to become longer; and will accordingly increase or decrease the drop of potential in the resistor 79.

An increase in the drop of potential in the resistor 79 caused by shortening of the loop is utilized by features of the control now to be described to cause the amplifier 34 to have greater output and increase the energization of the field 30 of the generator 28 to increase its output and drive the motor 3 faster, to stop decrease of the loop length, and cause it to restore to its former length, and vice versa upon decrease of the drop of potential in the resistor 79 caused by lengthening of the loop.

The control windings 42—43 of the amplifier are preferably alike and their inner adjacent ends are connected together at a point 83.

The point 83 is connected by a wire 84 to the wire 73 and therefore to the positive point 66 of the rectifier 64.

The opposite ends of the windings 42 and 43 are connected by wires 85—86 to the anodes 87—88 of a double electronic tube 89.

The common cathode 90 of the tube 89 is connected in a circuit comprising a wire 91, a resistor 92, a potentiometer 93 having a resistor element 94 and a rotary element 95 movable thereover, a wire 96, the said rotary element 76 of the potentiometer 72, and the said wire 74.

The potentiometer 93 will be referred to later in connection with a particular feature of the control, but here it is considered as having the rotary element 95 in position to cut out all of the resistance element 94. The cathode 90 is thus connected to the wire 75 and therefore to negative point 67 of the rectifier 64, through the resistor 92 alone.

The two anode-cathode circuits through the tube are thus connected across the rectifier points 66—67 through the respective windings 42—43 and the resistor 92.

The tube 89 has two grids 97—98.

The grid 98 is energized by a constant potential by being connected through a resistor 99 to a potential point 100 on the voltage divider, between the resistors 69 and 70.

The grid 97 is variably energized as will be described.

The tube 89 passes constant current through the winding 43 which tends in general to be at constant value, due to constant energization of the grid 98. The variable energization of the grid 97 is such that the tube passes current through the winding 42 that is equal to, or less than, or greater than, that in the winding 43 in accordance with variable energization of the grid 97, as will be referred to again later.

At 101 is a three element electronic tube comprising an anode 102, cathode 103 and grid 104.

The anode 102 is connected by a wire 105 to the mid point 83 of the windings 42—43, and therefore to the positive point 66 of the rectifier 64.

The cathode 103 is connected through a resistor 106 to the wire 82 and therefore to the negative point 67 of the rectifier 64.

The grid 104 is connected at a point 107 to the lower end of the resistor 79 and is therefore subjected to the potential at that point.

The cathode 103 is connected at a point 121 to the grid 97 of the tube 89 by a wire 108, through a resistor 109 and through the resistance element 110 of a potentiometer 111 having a rotary element 112 movable over the resistance 110 and through the rotary element 112 and a resistor 113.

That part of the operation has already been described by which the amplifier 34 is brought into action by its control windings 41 and 44 to cause the motors 3 and 9 to propel the strip 1 both at the same speed when the loop 5 has the preselected or wanted length, that is, the normal operating conditions.

The further operation of the system will now be described.

Under the said conditions, the cathode 103 of the tube 101 will be at a certain negative potential as will be understood, due to its described connections.

The photo tube current flowing in the described photo tube circuit which includes the resistor 79, produces a drop of potential in the resistor 79, causing the point 107 and the grid 104 to have a certain potential negative with respect to the potential of the cathode 103.

The grid 97 of the tube 89 is energized from the potential of the cathode 103 of the tube 101 and under the normal operating conditions at which the loop 5 is of the desired length, the tube 89 passes current through the control winding 42 equal to that in the control winding 43; and the two windings 42—43 neutralize each other.

However, if the loop 5 were not at the desired predetermined length, or if its length should change, for example if the loop is or should become shorter than the predetermined desired length, then the current in the described photo tube circuit would be greater or would increase, due to exposure of more photo tubes to the lamp light.

This causes a greater drop of potential in the resistor 79; and the potential of the grid 104 of tube 101 becomes more negative; and the potential of the cathode 103 accordingly becomes more negative, according to the "cathode-follower" principle inherent in the connections; and the grid 97 of the tube 89 energized therefrom, as described, causes the tube 89 to pass less current through the control winding 42 of the amplifier. The control winding 43 then predominates over the control winding 42; and the polarity of the winding 43 being in the direction to "assist" the main windings 37 and 38, the output of the amplifier 34 increases, and increases the energization of the field 30 of the generator 28, causing it to drive the motor 3 at increased speed.

Increased speed of the motor 3 increases the supply of strip to the loop 5; and if it was shorter than the predetermined desired length it is lengthened; or if it has started to decrease in length for any reason, the decrease is stopped, and it is lengthened again to the desired length.

When the loop 5 comes to the desired length, the photo tube current is brought to the normal operation value and the motor 3 drives the strip at the same speed as the motor 9 and the predetermined length of the loop is maintained.

By a similar action, but conversely, if the loop 5 were too long instead of too short, or if it increased in length beyond the preselected length, instead of decreasing, the control winding 42 would predominate over the winding 43 and the output of the amplifier would be decreased and the generator 28 would drive the motor 3 at lower speed, until the preselected loop length is attained and thereafter maintained.

As referred to, the control winding 43 is energized at constant potential, but the current in the winding does not remain constant when the current in the winding 42 varies as described. When predominating current flows in the winding 42, through the left side of the tube 89, that side is more conductive than the right side, and some of the current flowing in the right side is diverted to the left side, thus magnifying the difference between the currents in windings 42—43, and magnifying the predominance of the winding 42. When the winding 43 predominates, its predominance is similarly magnified.

Thus the effect of a given change of potential at the point 107 caused by a change of loop length, to correctively change the speed of the motor 3, is magnified and the control made more sensitive thereby.

It will be seen to be a part of the foregoing operation that when the windings 42—43 are made unequal by shortening or lengthening of the loop 5, and the speed of the motor 3 is changed thereby to restore the desired loop length, the windings 42—43 return to equality when the desired loop length is attained.

Provision is made as follows by which the predetermined length of the loop 5, maintained constant by the control as described, may be preselected.

A potentiometer 114 comprising a resistance element 115 and a rotary element 116 movable thereover, has the resistance element 115 connected across the resistors 69 and 70 of the voltage divider by wires 77, 117 and 118 as shown. The rotary element 116 will therefore be at different potentials as it is moved. The rotary element 116 is connected to the resistance element 110 of the potentiometer 111 by a wire 119. By varying the position of the rotary element 116, its variable potential will be applied through the potentiometer 111 to the grid 97 of the tube 89; and it may be made either to oppose or assist the potential applied on the grid 97 from the cathode 103 of the tube 101.

With the system in normal operation as described and with the loop 5 being maintained at any given length, the length of the loop 5 determines a value of photo tube current such as to cause the potential in the grid 97 of the tube 89 to be equal to the constant potential on the grid 98, whereby as described the two control windings 42 and 43 are mutually neutralized.

Upon changing the potential on the grid 97 by the potentiometer 114 as referred to, the grids 97 and 98 will have unequal potentials, and one control winding 42 or 43 will predominate over the other; with the described result of changing the length of the loop 5 until a new length is reached at which normal operation is restored and the new length maintained.

Thus the maintained constant length of the loop can be preselected and established by manipulating the potentiometer 114.

In the preferred practice a long length of loop is preset and maintained that intercepts light from all but the lower end of the photo tube bank.

As an illustrative example the pit will be deep enough to accommodate a loop fifty feet long, and with corresponding vertical lengths of lamp bank and photo tube bank, and with only the lower two feet of the photo tube bank exposed to the lamp light, for the following purpose.

It is desirable to maintain uninterrupted feeding of the strip to the process. When the inner end of the strip on the supply reel is reached, the outer end of a fresh strip from another supply reel is attached, to it, for example by welding.

During this operation, the motor 3 is stopped temporarily by the operator by means not shown and the motor 9 goes on propelling strip out of the loop to the process and the loop becomes shorter and shorter. The said 50 feet length of loop is enough so that there will still be some loop left when the fresh strip is attached, and the motor 3 is then started up again and the control restores the loop to its regulated preselected length.

Referring again to the potentiometer 111, movement of its rotary element 112 adjustably varies the portion of the resistance element 110 in the energizing circuit of the grid 97.

This provides means for adjusting the sensitivity with which changes of potential on the grid 97 occur in response to changes of potential of the cathode 103 caused by changes of photo tube current in the resistor 79.

As described, the loop 5 comes to its regulated preselected length, when the windings 42—43 become mutually neutralized by equal currents, and to change the regulated length, their relative energization is changed by adjustably modifying the potential on the grid 97 by means of the potentiometer 114 as described.

As described, the anode-cathode circuit of the tube 101 is across the rectifier 64 through the resistor 106. It will be apparent that the grid 97 of the tube 89 is energized by the drop of potential in the resistor 106, its energizing circuit being connected to the cathode 103 of the tube 101, by the wire 108 at the point 121.

The drop of potential in the resistor 106 varies with the potential of the grid 104 which varies with the potential at the point 107.

Figures 2, 3:
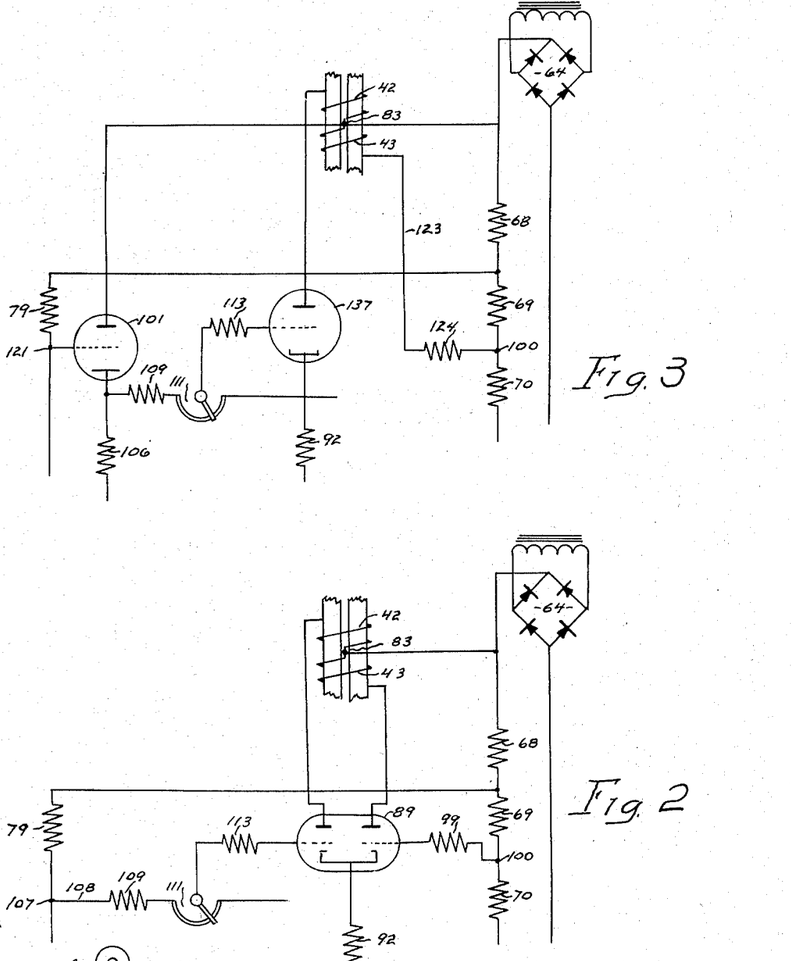
Figs. 2, 3, 4 and 5 are views similar to fragmentary portions of Fig. 1, illustrating respectively modifications which may be utilized.

As a modification shown in Fig. 2 satisfactory in some cases, the wire 108 can be connected directly to the point 107 instead of to the point 121 of Fig. 1 with the same operating results, thus eliminating the tube 101.

There is however the following advantage in utilizing the tube 101 and the described connections therewith and deriving the varying energizing potential for the grid 97 from the point 121 instead of from the point 107.

In practice, it has been found that impulses or transients of current are sometimes induced in the energizing circuit of the grid 97 from sources outside the control system, and in the absence of countervailing provisions, the tube 89 will respond thereto and not respond solely to the variations of applied grid potential caused by the photo tube current variations in the resistor 79, thus vitiating the accuracy of the control.

By introducing the tube 101 and its described connections, the said energizing circuit for the grid 97, is made to be one of low impedance, because of which the effects of said impulses or transients are thereby rendered negligible.

While it is preferred to energize the amplifier winding 43 from the point 100 on the voltage divider through the main electrodes of a double tube 89 as shown in Fig. 1, to have the advantage of magnification of the differential effect of the windings 42—43 as described, the winding 43 could be energized at constant value as shown in Fig. 3 as a modification by connecting it directly to the point 100; by a wire 123 through a resistor 124; in which case a single three element tube 137 will be suitable.

In the foregoing description, the amplifier windings 44 and 41 are described as energized by the output voltages, respectively, of the generators 15 and 28, and commensurably therewith; and the motors 9 and 3 are driven by the output voltages of the generators 15 and 28 respectively, and run at respective speeds commensurable therewith. In a broad aspect of the invention it is therefore equally correct to say that the windings 44 and 41 are energized commensurably with the respective speeds of the motors 9 and 3.

Figure 4:
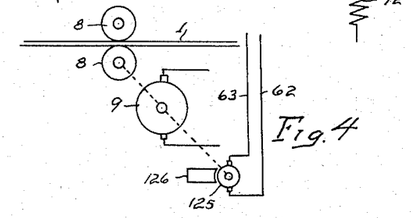

In this connection, if desired for any reason, energization of the winding 44, through the wires 62—63 commensurably with the speed of the motor 9, could be provided as shown in Fig. 4, by a tachometer generator 125 having a constant field 126 and driven by the motor 9.

A similar arrangement not shown could be provided to energize the winding 41 commensurably with the speed of the motor 3.

It is to be noted that when the motors 3 and 9 are both propelling the strip at the same speed and maintaining the loop at a constant length, it is not essential that the two motors themselves have the same speed; and in practice they would in many cases have different speeds, due to some difference in diameter of the propelling rolls 2—2 and 8—8, or other causes.

The system as described will regulate the loop length to a constant value, at different constant speed of the strip going to the process; for example a high speed of 1200 feet per minute or a low speed of 600 feet per minute.

The speed of the strip is preferably changed or adjusted by adjusting the field 17 of the generator 15 at the rheostat 19.

If the field 17 be increased, for example, it will increase the output voltage of the generator 15 and thereby the speed of the motor 9, and the speed of the strip.

This increased generator output will energize the amplifier winding 44 to a new higher value. The amplifier output will increase energization of the generator field 30 to a new higher value. The generator 28 will have higher voltage output and will energize the amplifier winding 41 to a new higher value, "balancing" the new higher value of the winding 44, as described hereinbefore, and giving the motor 3 a new higher normal operating speed.

As mentioned, when the windings 41—44 come to "balance" as described and the motor 3 is at the normal operating speed and the loop 5 is at the predetermined constant length, the two windings 42—43 will be mutually neutralized; and will be caused to preponderate, one over the other, only upon deviation of the loop length from the predetermined length.

When the system is adjusted in the foregoing manner, from low strip speed to high strip speed the windings 41—44 begin to come to "balance" at higher values and the motor 3 speeds up toward a higher normal operating speed. If its motor characteristics are such that its speed increases rectilinearly, then, when it reaches the normal operating speed, the windings 42—43 will again be mutually neutralized. But if its speed should not increase rectilinearly, then when the windings 41—44 are in balance, the speed of the motor 3 may be less than the speed required to bring the loop to the predetermined length; and the loop may be too short. In such event the winding 42 will predominate over the winding 43 and raise the voltage of the generator 28 and give the motor the further increment of speed to make it attain the necessary speed; and also in such event, when the motor reaches the necessary normal speed at which the length of the loop stops changing, the winding 42 may continue to have some predominance over the winding 43.

It is therefore not an essential feature of the invention that the windings 42—43 shall always become mutually neutralized when the loop is at its constant predetermined length.

In connection with adjustably changing the speed of the strip 1 propelled by the motor 9 as referred to, it will be noted that, irrespective of what the speed may be at the time when a given change of loop length occurs, the change of loop length will always produce substantially the same preponderance of one control winding, 42 or 43, over the other, and this will effect in general approximately the same change in amperage of energization of the generator field 30.

If the speed of the strip has been adjusted to be high, for example 1200 feet per minute, and the generator field 30 is accordingly highly energized as described, this said change of its energization will be a small percentage of change and will effect a correspondingly small percentage of change in the speed of the motor 3; for example it may change it by 10%.

If however the speed strip has been adjusted to be low, at say 600 feet per minute and the generator field 30 is therefore relatively weakly energized, this same change in its energization will be a large percentage of change and will change the motor speed by a large percentage, say 20%.

Thus at low strip speeds, even small changes in the loop length, or vibrations of or swinging of the loop in the pit, will tend to make the motor 3 speed up and slow down with a great or even violent change of speed, as the system operates to maintain constant loop length. This is in some cases undesirable and provision is made to correct it as follows.

The rotary elements 95 and 76 of the potentiometers 93—72 are preferably connected to rotate in unison as indicated by the dotted line connecting them.

In the positions thereof in Fig. 1, the potentiometer resistance elements 94 and 71 are shorted out, and the circuit energizing the amplifier differential windings 42—43 through the tube 89 by way of wire 91 and resistor 92, has connection directly with the wire 75 by wires 96 and 74, as described, and the differential windings have the maximum effectiveness in changing the generator field 30.

At 127 is a transformer energized from the A.C. supply mains 47.

The secondary 128 thereof energizes a loop circuit comprising a rectifier 129, a wire 130, the resistance element 94 by way of wire 96, a wire 131, and the A.C. windings 132—132 of a saturable reactor 133. The saturable reactor 133 has a D.C. winding 134 connected across the wires 62—63 to be energized commensurably with the adjusted speed of the motor 9.

The saturable reactor applies unidirectional output potential to the wires 130—131, these wires being bridged by a resistor 135 and a capacitor 136; and the potential may be considered positive in the wire 130.

The saturable reactor core is, in a well known manner, worked at flux values such that the potential on the wires 130—131 increases upon an increase of current in the D.C. winding 134 caused by an increase of potential in the energizing wires 62—63; and vice versa; and with a suitable value, for the resistor 135, as well known by those skilled in the art, the output potential on the wires 130—131 will change rectilinearly with changes of current in the D.C. winding 134.

The correcting operation of these parts, which will now be described is, that when the motor 9 drives the strip at a lower speed, the preponderance of the amplifier winding 43 over the winding 42, occurring upon any decrease of loop length, will be reduced from what it would otherwise be, resulting in a reduced percentage of increase of the field winding 30 and a reduced percentage of increase of speed of the motor 3 as it corrects that loop-length, than would otherwise occur.

To this end the potentiometers 93 and 72 have their rotary elements set to some intermediate position, to correspond to some intermediate strip speed; at which the voltage on the wires 62—63 is at some intermediate value, and the field 30 of generator 28 is at a certain value, and the current flowing through control winding 42 by way of tube 89, resistor 92, and the resistance elements 94 and 71 of the potentiometers to the wire 75, opposed by the potential of the wires 130—131 will upon a decrease of loop length cause the winding 42 to be predominated over by the winding 43, by an amount that will cause an increase of the field 30 by say 10% and speeding up of the motor 3 by 10% to restore the loop length.

If then the adjusting field 17 be increased to increase the strip speed, thereby increasing the voltage on the wires 62—63, the field 30 of generator 28 will operate at a higher value as described. At the same time the opposing potential on the wires 130—131 opposing the winding 42 will be increased, and the preponderance of winding 43 occurring upon a decrease of loop length will be increased and the resulting increment of increase of the field 30 will be greater; but because the field 30 is stronger, the percentage of its increase will still be small, and the motor 3 will speed up by a small percentage as it restores the loop length.

Thus the percentage of change of the strength of the field 30 upon the occurrence of a given change of loop length can, by means of potentiometer adjustment, be made approximately the same, whether the speed of the strip is high or low.

Similarly, but conversely, if the strip speed be adjustably reduced, the generator 30 will have relatively weak energization; the preponderance of the winding 43 occurring on decrease of loop length will be decreased; and the percentage of increase of the generator field 30 and speed up of the motor 3 to restore the loop length will again be small.

Obviously the action will be the same if the occurring change of loop length be an increase, instead of a decrease, as has been chosen here for description purposes.

In Fig. 1 the photo tube circuit is a simple circuit across the rectifier 64, with the photo tubes 33 and the resistor 79 in series therein, and the drop of potential in the resistor 79 is utilized to effect regulation as the photo tube current changes with loop length.

With this arrangement, the potential across the bank of photo tubes themselves is variable in accordance with the variable potential drop in the resistor 70.

Figure 5:
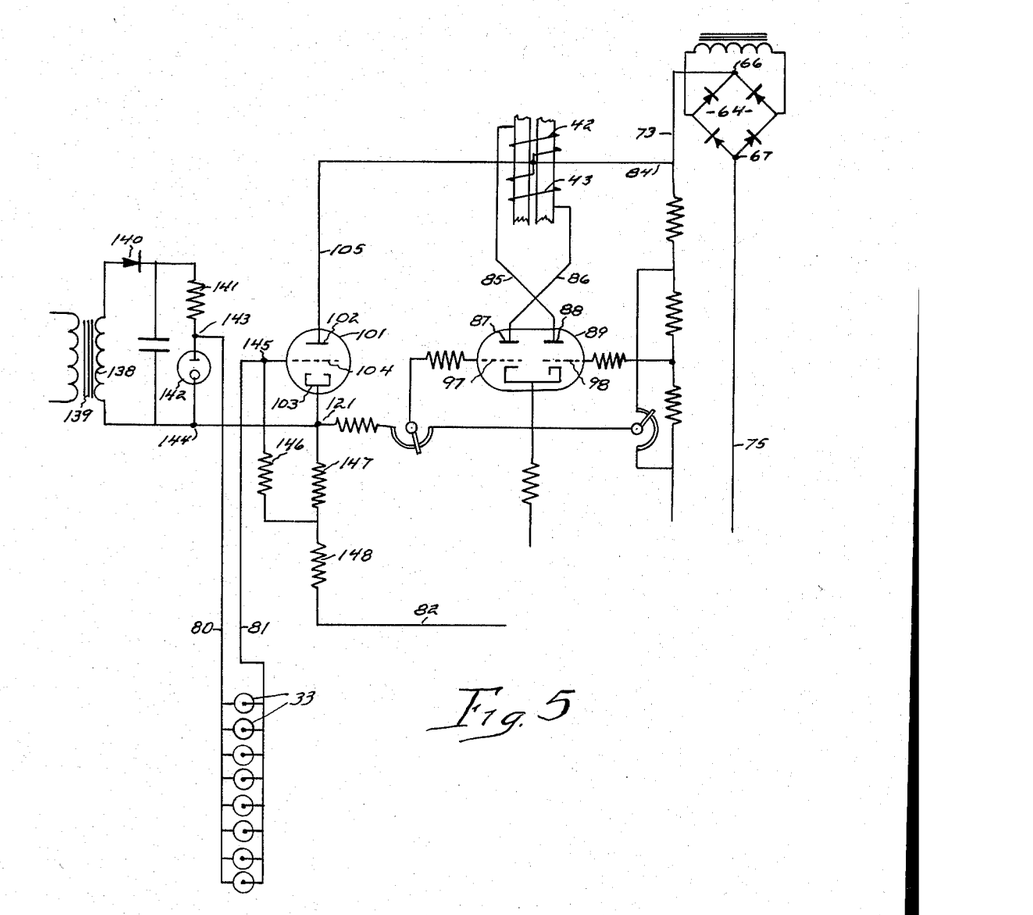

While this arrangement works satisfactorily in most cases, there may be instances in which the more sensitive and uniform regulation that would result from constant potential on the lamps is wanted, and in such cases the modification shown in Fig. 5 may be utilized.

Parts in Fig. 5 that are the same as in Fig. 1 have been given the same reference characters and need not be described again here.

The secondary 138 of a transformer 139 energizes a local circuit containing a resistor 141, and a voltage regulating tube 142; the latter being of a known type that will maintain constant potential across its terminals 143—144, as current through it varies.

A rectifier 140 establishes positive polarity for the terminal 143.

There is a photo tube circuit from the point 143, by wire 80, tubes 33—33, wire 81, to a point 145, thence through a resistor 146, and a resistor 147, to point 121 and back to terminal point 144.

The potential across the terminals 143—144 of the voltage regulating tube 142 is thus impressed upon the photo tube circuit, as a tube current supply potential.

The grid 104 of tube 101 is connected to point 145, and the cathode 103 is connected to the point 121.

Apparently there is a drop of the tube supply potential, from the point 145 through the resistors 146 and 147 to the point 121. This however elevates the potential at the point 145 and on the grid 104; and, cathode follower conditions being present, this elevates the potential on the cathode 121.

Loss of potential in the resistors 146—147 of the tube circuit is therefore compensated for and recovered at the point 121, and the tube circuit 80—81 and the tubes 33—33 are subjected to the constant potential of the terminals 143—144 as if the resistors 146—147 were not in the circuit.

A variation of photo tube circuit current, due to a change of loop length, as described hereinbefore, for example an increase of current due to shortening of the loop, increases the drop in the resistors 146 and 147 and raises the potential of the grid 104 and cathode 103, and the potential at the point 121.

This raises the potential on the grid 97 of tube 89 and as described for Fig. 1, will cause the left side of tube 89 to pass more current.

In Fig. 1, this caused the differential winding 42 to predominate and reduce the speed of the motor 3 and shorten the loop; but here the length of the loop is to be restored by lengthening it so that the winding 43 must be the one to predominate. This is done by crossing the wires 85—86 so that the winding 43 is connected to the left anode 87, and the winding 82 to the right anode.

In the system illustrated in Fig. 1, and Fig. 5, satisfactory operation as described above will result when certain elements thereof have the following values.

| | | |
|---|---|---|
| Rectifier 64 output voltage | volts | 200 |
| Resistor 68 | ohms | 3500 |
| Resistor 69 | do | 470 |
| Resistor 70 | do | 470 |
| Resistor 79 | meg. ohms | 3.3 |
| Resistor 109 | ohms | 100,000 |
| Resistor 113 | do | 100,000 |
| Resistor 99 | do | 100,000 |
| Resistor 92 | do | 15,000 |
| Resistor 106 | do | 22,000 |
| Resistor 141 | do | 10,000 |
| Resistor 146 | meg. ohms | 3.3 |
| Resistor 147 | ohms | 10,000 |
| Resistor 148 | do | 10,000 |
| Resistance element 110 | do | 100,000 |
| Resistance element 115 | do | 2,500 |
| Resistance element 71 | do | 1,000 |
| Resistance element 94 | do | 1,000 |

Tube 89, a commercial tube No. 6SN7.
Tube 101, a commercial tube No. 6J5.

I claim:

1. In a control system for maintaining a loop at constant length in a strip of material, a first motor propelling the strip into the loop; a second motor propelling the strip out of the loop at constant speed; a photo-tube circuit energized with D.C. and containing a bank of photo tubes and a resistor; the loop depending between the tube bank and a light source and causing the current in the circuit and the drop of potential in the resistor to decrease or increase as the loop lengthens or shortens; a generator driven at constant speed and having a field winding and supplying output current to the first motor to drive it; means variably energizing the field winding to vary the generator output to vary the first motor speed, said means being actuated by an increase or decrease of said drop of potential in the resistor to effect respectively increase or decrease of the first motor speed.

2. In a control system for maintaining a loop at constant length in a strip of material, a first motor propelling strip into the loop; a second motor propelling the strip out of the loop at constant speed; a generator driven at constant speed and having a field winding and supplying output current to the first motor to drive it; a magnetic amplifier energized from an A.C. supply and supplying rectified output to the field winding; a first control winding on the amplifier energized with current at a constant value; and poled to tend to increase the amplifier output; a second control winding on the amplifier energized with current at a value commensurable with the speed of the first motor and poled to tend to reduce the amplifier output, whereby the first motor tends to drive the strip at the same speed as the second motor and maintain the loop length constant.

3. The system described in claim 2 and in which the amplifier has other control winding means, and means is provided to energize the same to cause it to increase the amplifier output in response to a decrease of loop length and to tend to decrease the amplifier output in response to an increase of loop length; whereby the first motor is caused to propel the strip at the same speed as the second motor and maintain a certain length in the loop and to restore it to said length upon deviations therefrom.

4. In an electric control for maintaining constant the length of a loop in linearly propelled strip material, a first electric generator driven at constant speed and having a field; a first electric motor propelling the strip into the loop and driven by output of the first generator at speed commensurable with its field energization; a second electric generator driven at constant speed and having a field; a second electric motor propelling strip out of the loop and driven by output of the second generator at constant speed, commensurable with constant energization of its field; means to adjust the constant field energization of the second generator to change its output voltage to adjustably change the constant speed of the second motor; first control means actuated responsive to changes of loop length and changing the first generator field energization to cause the first motor to have a speed that maintains the loop of constant length at all adjusted speeds of the second motor; second control means actuated responsive to adjustment changes of the output voltage of the second generator to reduce the degree of change of the first generator field energization by the first control means commensurably with adjustment decreases of output voltage of the second generator.

5. In an electric control for maintaining constant the length of a loop in linearly propelled strip material, a first electric generator driven at constant speed and having a field winding, a first electric motor propelling strip into the loop and driven by output of the first generator at speed commensurable with its field energization, a second electric motor running at constant speed propelling the strip out of the loop at constant speed; means to adjust the constant speed of the second motor; first control means actuated responsive to changes of loop length and changing the first generator field energization to cause the first motor to have a speed that maintains the loop at constant length at all adjusted speeds of the second motor; second control means actuated responsive to adjustment changes of the speed of the second motor to reduce the degree of change of the first generator field energization by the first control means, commensurably with adjustment decreases of the speed of the second motor.

6. In an electric control for maintaining constant the length of a loop in linearly propelled strip material, a first electric generator driven at constant speed and having a field; a first electric motor propelling the strip into the loop and driven by output of the first generator at speed commensurable with its field energization; a second electric generator driven at constant speed and having a field; a second electric motor propelling strip out of the loop and driven by output of the second generator at constant speed commensurable with constant energization of its field; means to adjust the constant field energization of the second generator to change its output voltage to adjustably change the constant speed of the second motor, control means actuated responsive to changes of loop length and changing the first generator field energization to cause the first motor to have a speed that maintains the loop of constant length at all adjusted speeds of the second motor.

7. In an electric control for maintaining constant the length of a loop in linearly propelled strip material, a first electric generator driven at constant speed and having a field winding, a first electric motor propelling strip into the loop and driven by output of the first generator at speed commensurable with its field energization, a second electric motor running at constant speed propelling the strip out of the loop at constant speed; means to adjust the constant speed of the second motor; first control means actuated responsive to changes of loop length and changing the first generator field energization to cause the first motor to have a speed that maintains the loop at constant length at all adjusted speeds of the second motor; second control means actuated responsive to adjustment changes of the speed of the second motor to cause the percentage of change of the first generator field energization by the first control means to be substantially the same at all adjusted changes of speed of the second motor.

8. The system described in claim 2 and in which the amplifier has a pair of opposed differential control windings, one energized from a source of constant potential; means energizing the other winding of the pair to cause it to predominate and increase the amplifier output or be predominated and decrease the amplifier output, in response respectively to a decrease or increase of loop length; whereby the speed of the first motor is caused to change and restore the changed length of the loop to a constant value.

9. In a control system for maintaining a loop at constant length in a strip of material, a first motor propelling the strip into the loop; a second motor propelling the strip out of the loop at constant speed; a phototube circuit energized with D.C. and containing a bank of photo tubes and a resistor; the loop depending between the tube bank and a light source and causing the current in the circuit and the drop of potential in the resistor to decrease or increase as the loop lengthens or shortens; a generator driven at constant speed and having a field winding and supplying output current to the first motor to drive it; means variably energizing the field winding to vary the generator output to vary the first motor speed, said means being actuated by an increase or decrease of said drop of potential in the resistor to effect respectively increase or decrease of the first motor speed; said means also comprising an amplifier having an output energizing the field winding, and a pair of opposing differential control windings, energized respectively through two anode-cathode tube circuits, controlled by respective grids, and one grid being energized from a constant potential source and the other grid being energized commensurably with the drop of potential in the resistor.

10. In a control system for maintaining a loop of constant length in a strip of material, a first motor propelling the strip into the loop; a second motor propelling the strip out of the loop at constant speed; a photo tube circuit energized from a source of constant potential, and containing a bank of photo tubes and resistance means; the loop depending between the photo tubes and a light source and causing the current in the photo tube circuit and in the resistance means to vary as the loop lengthens and shortens; means actuated by variations of drop of source potential in the resistance means caused by variations of current in the tube circuit to vary the speed of the first motor to cause it to correct variations of the loop length and maintain its length constant; and means compensating for changes of source potential drop in the resistance means and maintaining the potential on the bank of tubes at a constant value.

11. In a control system for controlling the length of a loop in a line of strip material, a first motor propelling strip into the loop; a second motor running at constant speed and propelling the strip out of the loop, at constant speed; a control controlling the speed of the first motor to cause it to propel the strip at the same speed as the second motor, when the loop is at a desired predetermined length; said control comprising a winding, reduced energization of which will reduce the speed of the first motor, and a magnetic amplifier having an output energizing the winding, and the amplifier having a first control winding energized proportionally to the speed of the first motor and poled in the direction to reduce the amplifier output and having a second control winding energized at constant value proportionally to the speed of the second motor and poled in the direction to increase the amplifier output.

12. The system described in claim 11 and in which another control is provided to return the length of the loop to said desired predetermined length upon deviations therefrom comprising photo tubes and a source of light variably intercepted by change of length of the loop, and illuminating the photo tubes; a photo tube circuit in which current increases and decreases upon shortening and lengthening of the loop; a third amplifier control winding energized at constant value and poled in the direction to increase the amplifier output; a fourth amplifier control winding energized inversely proportionally to the current in the photo tube circuit and poled in the direction to decrease the amplifier output; the third or the fourth winding predominating one over the other, to effect increase or decrease of amplifier output and increase or decrease of speed of the first motor upon shortening or lengthening of the loop to restore the loop to said desired predetermined length.

References Cited in the file of this patent

UNITED STATES PATENTS

| | | |
|---|---|---|
| 2,147,467 | Stephenson | Feb. 14, 1939 |
| 2,278,136 | Otis et al. | Mar. 31, 1942 |
| 2,296,719 | Looney | Sept. 22, 1942 |
| 2,306,750 | Rendal | Dec. 29, 1942 |
| 2,422,651 | Ayers | June 24, 1947 |
| 2,448,835 | Schefe | Sept. 7, 1948 |